(12) United States Patent
Kania et al.

(10) Patent No.: US 7,816,470 B2
(45) Date of Patent: Oct. 19, 2010

(54) AQUEOUS-BASED POLYMERS FOR SOUND DEADENING APPLICATIONS

(75) Inventors: Charles M. Kania, Natrona Heights, PA (US); Simion Coca, Pittsburgh, PA (US); Anthony Palermo, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/466,486

(22) Filed: Aug. 23, 2006

(65) Prior Publication Data

US 2008/0051499 A1 Feb. 28, 2008

(51) Int. Cl.
- *C08F 26/08* (2006.01)
- *C08F 10/00* (2006.01)
- *C08F 20/00* (2006.01)
- *C08F 20/06* (2006.01)
- *C08F 18/00* (2006.01)
- *C08F 220/10* (2006.01)
- *C08F 16/12* (2006.01)
- *C08F 212/06* (2006.01)
- *C08F 210/00* (2006.01)

(52) U.S. Cl. .......... 526/264; 526/348.7; 526/303.1; 526/317.1; 526/320; 526/329; 526/332; 526/347; 526/348

(58) Field of Classification Search .......... 526/348.7, 526/264, 303.1, 317.1, 320, 329, 332, 347, 526/348

See application file for complete search history.

(56) References Cited

U.S. PATENT DOCUMENTS

| | | | | |
|---|---|---|---|---|
| 3,491,011 | A | * 1/1970 | Hart et al. | 428/457 |
| 3,879,495 | A | 4/1975 | Yoshikazu et al. | 260/878 R |
| 5,356,956 | A | 10/1994 | Masami et al. | 523/201 |
| 6,531,541 | B1 | 3/2003 | Desai et al. | 524/832 |
| 6,677,422 | B2 * | 1/2004 | Coca et al. | 526/348.7 |
| 6,787,597 | B1 | 9/2004 | Martin et al. | 524/522 |
| 7,030,185 | B2 * | 4/2006 | Tominaga et al. | 524/591 |
| 2001/0053803 | A1 | 12/2001 | Kazuo et al. | 523/201 |

* cited by examiner

*Primary Examiner*—William K Cheung
(74) *Attorney, Agent, or Firm*—Diane R. Meyers

(57) ABSTRACT

Copolymers prepared in aqueous medium from macromonomers and one or more ethylenically unsaturated monomers are disclosed. The copolymers are useful for sound and vibration dampening applications.

29 Claims, No Drawings

AQUEOUS-BASED POLYMERS FOR SOUND DEADENING APPLICATIONS

FIELD OF THE INVENTION

The present invention relates to copolymers prepared with macromonomers and the use of these copolymers in sound deadening applications.

BACKGROUND OF THE INVENTION

Typically, precut asphalt- or rubber-based patches are used for lining floor pans, deck lids and doors of automobiles to dampen or reduce road and engine noise and vibrations, preventing them from permeating into the passenger compartment of the motor vehicle. Sprayable coatings that are capable of being applied by robotics are desirable to provide labor and cost savings, reduced part inventories and flexibility in design specifications for damping properties. Waterborne or high solids coatings are desirable in trim shop applications where only air dry cure is feasible. It is important that these coatings dry quickly, in about 2 to 3 hours or be baked after application, so that the coating does not transfer to other parts of the automobile during assembly operations.

Generally, any coating that contains a volatile component such as water must undergo a decrease in volume as the volatile component evaporates from the surface of the coating. As the volatile component leaves the coating, contraction forces act to pull the coating inward in all directions. However, without intending to be bound by any theory, it is believed that if the coating has sufficient cohesive strength, the coating will contract in only one dimension, that is, the coating thickness will decrease while the coating resists contraction in any direction parallel to the substrate surface. By contrast, if a coating lacks cohesive strength sufficient to resist contraction parallel to the substrate surface, contraction forces will cause the coating to break up into small flat segments that are separated by continuous linear voids. This surface defect is commonly referred to as "mudcracking".

The automotive industry would derive a significant economic benefit from an aqueous coating composition which can be spray applied to form a coating which dries quickly or which is baked, is essentially free of mudcracking and which provides sound and vibration dampening.

SUMMARY OF THE INVENTION

The present invention is directed to a copolymer prepared by polymerizing in an aqueous medium one or more polymerizable ethylenically unsaturated monomers in the presence of a macromonomer that is comprised of at least 30 mole percent of residues having the following alternating structural units:

-[DM-AM]- wherein DM represents a residue from a donor monomer, AM represents a residue from an acceptor monomer, at least 15 mole percent of the macromonomer comprises a donor monomer of the structure:

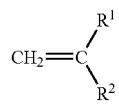

wherein $R^1$ is a linear or branched $C_1$ to $C_4$ alkyl, $R^2$ is selected from linear, cyclic or branched $C_1$ to $C_{20}$ alkyl, alkenyl, $C_6$ to $C_{20}$ aryl, alkaryl and aralkyl, wherein the macromonomer is substantially free of maleate monomer segments and fumarate monomer segments, and the macromonomer is substantially free of Lewis acids and transition metals.

The invention also provides a coating composition for sound and vibration dampening comprising an aqueous dispersion of polymeric microparticles in which the polymeric microparticles comprise the copolymer as described above and a filler material comprising from 20 to 90 percent by weight of the coating composition, the percentage by weight being based on total weight of the coating composition.

DETAILED DESCRIPTION OF THE INVENTION

As used herein, the terms "macromonomer" and "copolymer" are meant to include the synthesized macromonomer and copolymer as well as residues from initiators, catalysts, and other elements attendant to the synthesis of the macromonomer and the copolymer, but not covalently incorporated thereto. Such residues and other elements considered as part of the macromonomer and copolymer can be mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The term "donor monomer" refers to monomers that have a polymerizable ethylenically unsaturated group that has relatively high electron density in the ethylenic double bond, and the term "acceptor monomer" refers to monomers that have a polymerizable ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309-319 (1999)). All e values recited herein are those appearing in the Polymer Handbook unless otherwise indicated.

In the Q-e scheme, Q represents the reactivity of a monomer and e represents the polarity of a monomer, which indicates the electron density of a given monomer's polymerizable ethylenically unsaturated group. A positive value for e indicates that a monomer has a relatively low electron density and is an acceptor monomer. A non-limiting example of an acceptor monomer includes maleic anhydride, which has an e value of 3.69. A low or negative value for e indicates that a monomer has a relatively high electron density and is a donor monomer. A non-limiting example of a donor monomer includes vinyl ethyl ether, which has an e value of −1.80.

As referred to herein, a "strong acceptor monomer" is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The macromonomer used in the present invention is directed to a copolymer composition wherein at least 30 mol %, or at least 40 mol %, or at least 50 mol %, or at least 60 mol %, or at least 75 mol % of residues of the copolymer are derived from alternating sequences of donor monomer—acceptor monomer pairs, having the alternating monomer residue units of structure:

where DM represents a residue from a donor monomer and AM represents a residue from an acceptor monomer. In an embodiment, the copolymer can be a 100% alternating copolymer of DM and AM. In another embodiment, at least 15 mol % of the copolymer can comprise a donor monomer having the following structure (I):

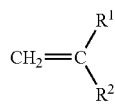

(I)

where $R^1$ is linear or branched $C_1$ to $C_4$ alkyl, $R^2$ is one or more of methyl, linear, cyclic or branched $C_1$ to $C_{20}$ alkyl, alkenyl, $C_6$ to $C_{20}$ aryl, alkaryl or aralkyl. In a further embodiment, at least 15 mol % of the copolymer can include an acrylic monomer as an acceptor monomer.

In an embodiment of the present invention, the macromonomer can incorporate a substantial portion of alternating residues of a mild donor monomer as described by structure I and a mild acceptor monomer, which can be an acrylic monomer. A non-limiting list of published e values for monomers that can be included as monomers described by structure I and acrylic monomers are shown in Table 1.

TABLE 1

Alfrey-Price e values for Selected Monomers

| Monomer | e value |
| --- | --- |
| Monomers of structure I | |
| Isobutylene | −1.20[1] |
| Diisobutylene | 0.49[2] |
| Acrylic Monomers | |
| Acrylic acid | 0.88[1] |
| Acrylamide | 0.54[1] |
| Acrylonitrile | 1.23[1] |
| Methyl acrylate | 0.64[1] |
| Ethyl acrylate | 0.55[1] |
| Butyl acrylate | 0.85[1] |
| Benzyl acrylate | 1.13[1] |
| Glycidyl acrylate | 1.28[1] |

[1] Polymer Handbook, Fourth Edition (1999).
[2] Rzaev et al., Eur. Polym. J., Vol. 24, No. 7, pp. 981-985 (1998).

In the present invention, the macromonomer can be substantially free of maleate monomer residues and fumarate monomer residues. Maleate and fumarate monomer residues can have e values greater than 2.0. These types of multifunctional monomers can provide too many functional groups to the copolymer which can create problems, for example, in coatings where a thermosetting composition may have a short shelf-life due to the overly functional nature of the copolymer.

Further, the macromonomer can be substantially free of transition metals and Lewis acids. As noted above, transition metals and Lewis acids have been used in the prior art to make alternating copolymers of mild donor monomers and mild acceptor monomers. In the present invention, transition metal or Lewis acid adjuncts are not used in preparing the macromonomer. Thus, the removal of these materials is not necessary after polymerization and the resulting macromonomer will not have the drawbacks which can occur in macromonomers that contain transition metals or Lewis acids.

Any suitable donor monomers can be used in the present invention. Non-limiting examples can include a mild donor monomer described by structure I, including but not limited to isobutylene, diisobutylene, dipentene, isoprenol, and mixtures thereof. The donor monomer of structure I may have functional groups. For example, the group $R^2$ of the donor monomer of structure I may include a functional group, such as but not limited to hydroxy, epoxy, carboxylic acid, ether, carbamate, amide, and combinations thereof.

The mild donor monomer of structure I can be present in the macromonomer at a level of at least 15 mol %, or at least 25 mol %, or at least 30 mol %, or at least 35 mol %. The mild donor monomer of structure I can be present in the copolymer composition at a level of up to 50 mol %, or up to 47.5 mol %, or up to 45 mol %, or up to 40 mol %. The level of the mild donor monomer of structure I used can be determined by the properties that are to be incorporated into the macromonomer. Residues from the mild donor monomer of structure I may be present in the macromonomer in any range of values inclusive of those stated above.

Non-limiting examples of suitable other donor monomers that may be used with the mild donor monomers mentioned above can include ethylene, butene, styrene, substituted styrenes, methyl styrene, vinyl ethers, vinyl esters, vinyl pyridines, divinyl benzene, vinyl naphthalene, divinyl naphthalene and mixtures thereof. Vinyl esters can include vinyl esters of carboxylic acids, which can include, but are not limited to, vinyl acetate, vinyl butyrate, vinyl 3,4-dimethoxybenzoate, vinyl benzoate and mixtures thereof. The use of other donor monomers is optional. In embodiments wherein other donor monomers are present, they can be present at a level of at least 0.01 mol % of the copolymer composition, or at least 0.1 mol %, or at least 1 mol %, or at least 2 mol %. Further, the other donor monomers can be present at a level of up to 25 mol %, or up to 20 mol %, or up to 10 mol %, or up to 5 mol %

The macromonomer of the present invention can include acceptor monomers as part of the alternating donor monomer—acceptor monomer units along the copolymer chain. Any suitable acceptor monomer can be used. Suitable acceptor monomers can include strong acceptor monomers and mild acceptor monomers. A non-limiting example of suitable acceptor monomers are those described by the structure (II):

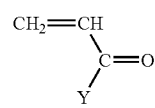

(II)

where Y is selected from the group consisting of —$NR^3_2$, —O—$R^5$—O—C(=O)—$NR^3_2$, and —$OR^4$, $R^3$ is selected from the group consisting of H, linear or branched $C_1$ to $C_{20}$ alkyl, and linear or branched $C_1$ to $C_{20}$ alkylol, $R^4$ is selected from the group consisting of H, linear or branched $C_1$ to $C_{20}$ alkyl, alkylol, $C_6$ to $C_{20}$ aryl, aralkyl and alkaryl. $R^5$ is a divalent linear or branched $C_1$ to $C_{20}$ alkylene group.

Examples of suitable acceptor monomers for use in the present invention can include, but are not limited to, hydroxyethyl acrylate, hydroxypropyl acrylate, acrylic acid, methyl acrylate, ethyl acrylate, butyl acrylate, isobutyl acrylate, isobornyl acrylate, 2-ethylhexyl acrylate and mixtures thereof.

The acrylic acceptor monomers of structure II can be present in the copolymer composition at a level of at least 15 mol %, or at least 25 mol %, or at least 30 mol %, or at least 35 mol %. Further, the acrylic acceptor monomers of structure II can be present in the copolymer composition at a level of up to 50 mol %, or up to 47.5 mol %, or up to 45 mol %, or up to 40 mol %.

Non-limiting examples of suitable other mild acceptor monomers that may be used in the present invention can include acrylonitrile, methacrylonitrile, vinyl halides, vinyl alkyl sulfonates, acrolein and mixtures thereof. Vinyl halides can include, but are not limited to, vinyl chloride and vinylidene fluoride. The use of other mild acceptor monomers is optional. In embodiments wherein other mild acceptor monomers are present, they can be present at a level of at least 0.01 mol % of the copolymer composition, or at least 0.1 mol %, or at least 1 mol %, or at least 2 mol %. Further, the other acceptor monomers may be present at a level of up to 35 mol %, or up to 25 mol %, or up to 15 mol %, or up to 10 mol %.

In alternate embodiments of the present invention, the macromonomer can have a number average (Mn) molecular weight of at least 250, or at least 500, or within the range of from 500 to 10,000.

In other embodiments, the polydispersity or polydispersity index of the macromonomer can be less than 3, or less than 2.5. As used herein, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

An example of the alternating sequences of donor monomer—acceptor monomer pairs can include residues having the alternating structure III:

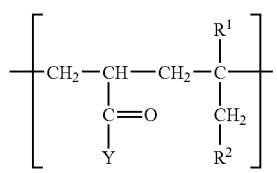

(III)

where $R^1$, $R^2$, and Y are defined as above. In an embodiment, the monomer residues containing the group Y are derived from one or more acrylic monomers and the monomer residues containing the groups $R^1$ and $R^2$ are derived from diisobutylene and/or isobutylene. The macromonomer of the present invention can also include other polymerizable ethylenically unsaturated monomers.

In an embodiment, the macromonomer of the present invention may have all of the incorporated monomer residues in an alternating architecture. A non-limiting example of a copolymer segment having 100% alternating architecture of isobutylene (IB) and an acrylic monomer (Ac) is shown by structure IV:

—Ac—IB—Ac—IB—Ac—IB—Ac—IB—Ac—IB—Ac—IB—Ac— (IV)

In other embodiments, the copolymer can contain alternating segments and random segments as shown by structure V, a copolymer of IB, Ac and other monomers, M:

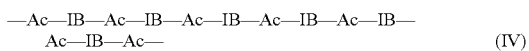

(V)

Structure V shows an embodiment of the macromonomer that includes alternating segments as shown in the boxes and random segments as shown by the underlined segments.

The random segments of the macromonomer may contain donor and/or acceptor monomer residues that have not been incorporated into the macromonomer by way of an alternating architecture. The random segments of the macromonomer may further include residues from other ethylenically unsaturated monomers. As recited herein, all references to segments derived from alternating sequences of donor monomer—acceptor monomer pairs are meant to include segments of monomer residues such as those shown by the boxes in structure V.

The other ethylenically unsaturated monomers for use in the macromonomer of the present invention, can include any suitable monomer which may not traditionally be categorized in the art as an acceptor monomer or a donor monomer.

In an embodiment, the other ethylenically unsaturated monomer, such as residue M of structure V, can be derived from at least one ethylenically unsaturated radically polymerizable monomer. As used herein, "ethylenically unsaturated radically polymerizable monomer" and like terms are meant to include vinyl monomers, allylic monomers, olefins, and other ethylenically unsaturated monomers that are radically polymerizable and not classified in the art as donor monomers or acceptor monomers.

Non-limiting examples of vinyl monomers from which M may be derived can include methacrylic monomers, allylic monomers, and mixtures thereof. Residue M may be derived from any alkyl methacrylates having from 1 to 20 carbon atoms in the alkyl group. Examples of alkyl methacrylates having from 1 to 20 carbon atoms in the alkyl group from which residue M may be derived can include methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates.

As used herein "allylic monomer(s)" means monomers containing substituted and/or unsubstituted allylic functionality, such as the radicals represented by the following general formula VI,

(VI)

where $R^{10}$ is hydrogen, halogen, or a $C_1$ to $C_4$ alkyl group. In an embodiment, $R^{10}$ can be hydrogen or methyl and general formula VI can represent the unsubstituted (meth)allyl radical, which encompasses both allyl and methallyl radicals. Any suitable allylic monomers can be used. Examples of suitable allylic monomers can include, but are not limited to, (meth)allyl alcohol; (meth)allyl ethers, such as methyl (meth) allyl ether; allyl esters of carboxylic acids, such as (meth)ally acetate, (meth)allyl butyrate, (meth)allyl 3,4-dimethoxybenzoate, and (meth)allyl benzoate.

The macromonomer of the present invention can be prepared using a variety of conventional techniques known in the art. In an embodiment, the macromonomer can be prepared by a method including the steps of (a) providing a donor monomer composition comprising a donor monomer of structure (I), and (b) adding an ethylenically unsaturated monomer composition comprising an acceptor monomer. In a further embodiment, the ethylenically unsaturated monomer composition can include a monomer of structure II. In another embodiment, the ethylenically unsaturated monomer composition can be added to the donor monomer composition in the presence of a free radical polymerization initiator in a suitable reaction vessel. These monomer solutions and the resulting macromonomer of the present invention can be substantially free of maleate-type monomers, fumarate-type monomers, Lewis acids, and transition metals.

In an embodiment, the monomer of structure I can be present in a molar excess based on the amount of acrylic acceptor monomer. Any amount of excess monomer of structure I may be used in the present invention in order to encourage the formation of the alternating architecture. In alternate embodiments, the excess amount of monomer of structure I may be at least 10 mol %, or up to 25 mol %.

Unreacted monomer of structure I can be removed from the resulting copolymer composition by any suitable technique known in the art, such as but not limited to evaporation. In an embodiment, the removal of unreacted monomer can be facilitated by the application of a vacuum to the reaction vessel.

Any suitable free radical initiator may be used in the present invention. Examples of suitable free radical initiators can include, but are not limited to, thermal free radical initiators, photo-initiators, redox initiators and mixtures thereof. Examples of suitable thermal free radical initiators can include, but are not limited to, peroxide compounds, azo compounds, persulfate compounds and mixtures thereof.

The polymerization reaction can be conducted using any suitable technique known in the art. The reaction can be conducted in bulk (i.e., absence of diluent) and via batch or continuous polymerization techniques. Batch techniques are described in U.S. Pat. No. 6,686,432, col. 12, line 33, to col. 13, line 15. Continuous methods of polymerization are described in U.S. Published Patent Application No. 2005/0113515 A1.

In an embodiment, the copolymer of the present invention can be prepared by polymerizing in an aqueous medium a polymerizable ethylenically unsaturated monomer in the presence of the macromonomer described above to form an aqueous dispersion of polymeric microparticles. In a further embodiment, the polymerizable ethylenically unsaturated monomer may be polymerized by aqueous free radical initiated emulsion polymerization techniques. Not intending to be bound by any mechanism, it is believed the ethylenically unsaturated monomer forms the polymer backbone and the macromonomer grafts (via free radical abstraction) to form macromonomer segments pendant to the polymer backbone, i.e., a comb-like structure.

Non-limiting examples of polymerizable ethylenically unsaturated monomers can include vinyl monomers such as esters of organic acids having terminal methylene groups which can constitute from 30 to 90, or from 40 to 80 percent by weight of the total monomer charge. Non-limiting examples of such esters can include alkyl acrylates and alkyl methacrylates containing from 1 to 18 carbon atoms in the alkyl group.

In an embodiment, the ethylenically unsaturated monomer can include an alkyl methacrylate containing from 1 to 3 carbon atoms in the alkyl group such as methyl methacrylate and ethyl methacrylate. In another embodiment, the ethylenically unsaturated monomer can include an alkyl methacrylate containing from 4 to 12 carbon atoms in the alkyl group, for example, butyl methacrylate and hexyl methacrylate; or an alkyl acrylate containing from 1 to 8 carbon atoms in the alkyl group, for example, butyl acrylate and 2-ethylhexyl acrylate; and mixtures thereof.

The ethylenically unsaturated monomer can include an alpha, beta-ethylenically unsaturated carboxylic acid that is copolymerizable with the other vinyl monomers. Not intending to be bound by any mechanism, it is believed that the unsaturated carboxylic acid will provide sites for subsequent neutralization with a base such as an organic amine to substantially stabilize the resultant polymeric latex. In alternate embodiments, the unsaturated carboxylic acid can constitute from 0.1 to 10, or from 1 to 5 percent by weight of the monomer charge. Non-limiting examples of unsaturated carboxylic acids can include acrylic acid, methacrylic acid and mixtures thereof.

In another embodiment, the ethylenically unsaturated monomer can be a copolymerizable monomeric material containing a vinyl group other than the vinyl monomers described herein. Examples of these materials can include monomers such as styrene, alpha-methyl styrene, alpha-chlorostyrene, allyl chloride and acrylonitrile. This unsaturated monomeric material can constitute from 0 to 60, or 0 to 40 percent by weight of the monomer charge.

In alternate embodiments, the macromonomer can be present in an amount of from 0.5 to 50, or from 5 to 20 percent by weight based on the weight of the total monomer charge.

The dispersion of polymeric microparticles in an aqueous medium can be prepared by conventional emulsion polymerization techniques that are well known to those skilled in the art. Suitable techniques for use in the present invention can include conventional emulsion batch process or a continuous process. An example of a batch process can be as follows. The unreacted microdispersion is fed over a period of from 1 to 4 hours into a heated reactor initially charged with water. An initiator can be fed in simultaneously as part of the microdispersion or it can be charged to the reactor before feeding in the microdispersion. The temperature can vary and may depend upon the specific initiator being used. The length of time can vary. In an embodiment, the time can range from 2 hours to 6 hours. In another embodiment, the temperature of reaction can range from 25° C. to 90° C.

In an embodiment, water and a small portion of the monomer charge can be added to a reactor with a small amount of surfactant and free radical initiator to form a seed. A preemulsion of the remaining monomers, surfactant and water can be fed along with the initiator over a prescribed period of time (3 hours) at a reaction temperature of 80-85° C. using a nitrogen blanket. After a one-hour hold, upon completion of the monomer feed, a post redox feed to reduce residual free monomer (including hydrogen peroxide/isoascorbic acid) can be added to the reactor. The latex product can be neutralized to a pH of 8.

Suitable surfactants for use in making the copolymer can include those which are conventionally used in emulsion polymerization and which are capable of forming micelles and stabilizing particles of polymerizing monomers in the aqueous medium.

Suitable surface active agents which may be used can include ionic or non-ionic types, or mixtures thereof.

Examples of anionic surface active agents can include ordinary soap such as alkali metal, ammonium and alkanolamine salts of fatty acids including sodium oleate, potassium palmitate, ammonium stearate and ethanolamine laurate. Further examples can be selected from the synthetic saponaceous materials including the higher aliphatic sulfates and sulfonates such as sodium lauryl sulfate and sodium cetyl sulfate. In an embodiment, sodium lauryl sulfate is used.

Suitable non-ionic surfactants can include alkylphenoxy polyethoxy ethanols having alkyl groups of from 7 to 18 carbon atoms and from 6 to 60 or more oxyethylene units, such as heptylphenoxy polyethoxy ethanols, octaphenoxy polyethoxy ethanols, nonylphenoxy polyethoxy ethanols and dodecylphenoxy polyethoxy ethanols; ethylene oxide derivatives of long-chain carboxylic acids such as lauric, myristic, palmitic, oleic; analogous ethylene oxide condensates of long-chain alcohols such as octyl, decyl, lauryl or cetyl alcohols; ethylene oxide derivatives of etherified or esterified polyhydroxy compounds having a hydrophobic hydrocarbon chain such as sorbitan monostearate containing 6 to 60 oxyethylene units.

The amount of surface active agent that is used can vary based on the selection of the monomers, the choice of surface active agent and the relative proportions of the monomers. In alternate embodiments, the total amount of surfactant that is fed to the reaction zone can be between 0.1 to 5 percent by weight based on total weight of monomers or within the range of 0.1 to 2.5 percent by weight.

Any suitable free radical initiator can be used. Suitable free radical initiators can include water-soluble and oil soluble initiators. The addition of certain initiators, such as redox initiators, can result in a strong exothermic reaction. Thus, it may be desirable to add the initiator to the other ingredients immediately before the reaction is to be conducted. Examples of water-soluble initiators can include ammonium peroxydisulfate, potassium peroxydisulfate and hydrogen peroxide. Examples of oil soluble initiators can include t-butyl hydroperoxide, dilauryl peroxide, t-butyl perbenzoate and 2,2'-azo-bis(isobutyronitrile). In an embodiment, redox initiators such as ammonium peroxydisulfate/sodium metabisulfite or t-butylhydroperoxide/isoascorbic acid can be utilized.

In an embodiment, the particle size of the polymer microparticle dispersion can be uniformly small. In alternate non-limiting embodiments, after polymerization, less than 20 percent of the polymer microparticles can have a mean diameter that is greater than 5 microns, or greater than 1 micron, or the microparticles can have a mean diameter of from 0.01 microns to 10 microns, or the mean diameter of the particles after polymerization can range from 0.05 microns to 0.5 microns. The particle size can be measured with a particle size analyzer such as the Coulter N4 instrument commercially available from Coulter. The particle size measurement is made in accordance with detailed instructions provided with the instrument. Generally, a sample of the aqueous dispersion is diluted with water until the sample concentration is within specified limits required by the instrument. The measurement time is ten (10) minutes.

In a non-limiting embodiment, the microparticle dispersions can include materials of relatively low viscosity. For example, dispersions can be prepared directly with a total solids content of from 20 to 70 percent. It is believed that the molecular weight of the polymer and viscosity of the claimed aqueous dispersions are independent of each other. In another embodiment, the weight average molecular weight can range from several thousand to greater than 500,000 grams per mole.

The coating composition of the present invention can further comprise a polymeric film-forming material which is chemically different from the polymeric microparticles discussed above. Non-limiting examples of suitable polymeric film-forming materials can include polyepoxides, polyurethanes, polyamides, polyesters, polyacrylates, polyvinyl chlorides, and mixtures and copolymers thereof.

In an embodiment, a polyacrylate film-forming material such as ACRONAL DS 3502 polyacrylate copolymer emulsion prepared from methyl acrylate, butyl acrylate, methyl methacrylate and methacrylic acid can be included in the coating composition. See ACRONAL DS 3502 Product Bulletin (November 1998).

In another embodiment, the polymeric microparticles can be present in the coating composition in an amount ranging from 1 to 40 percent by weight based on the total resin solids of the composition, or from 5 to 30 percent by weight.

Optionally, the coating composition can further comprise filler for improving the vibration and sound dampening capabilities of the coating. Any suitable fillers can be used. Non-limiting examples of suitable fillers can include mica, powdered slate, montmorillonite flakes, glass flakes, metal flakes, graphite, talc, iron oxide, clay minerals, cellulose fibers, mineral fibers, carbon fibers, glass or polymeric fibers or beads, ferrite, calcium carbonate, calcium, magnesium carbonate, barium sulfate, organo-modified clay, a mineral fiber such as calcium metasilicate, ground natural or synthetic rubber, silica, aluminum hydroxide, alumina powder and mixtures thereof. In an embodiment, the filler can be selected from calcium, magnesium carbonate, barium sulfate and mixtures thereof.

In alternate embodiments, the filler material can comprise from 20 to 90 weight percent of the coating composition on a basis of total weight of the coating composition, or from 50 to 80 weight percent.

In another embodiment, a plasticizer can be included in the dispersion phase with these polymers and copolymers. Any suitable plasticizer can be used. Non-limiting examples of suitable plasticizers can include adipates, benzoates, glutarates, isophthalates, phosphates, polyesters, sebacates, sulfonamides, glycols, terephthalates and mixtures thereof. The amount of plasticizer can range from 0.1 up to 50 weight percent of the total weight of the coating composition.

In other embodiments, the composition of the present invention can include a variety of optional ingredients and/or additives that can be dependent on the particular application of the composition, such as dyes or pigments such as carbon black or graphite, reinforcements, thixotropes, accelerators, surfactants, extenders, stabilizers, corrosion inhibitors, diluents, blowing agents and antioxidants. Suitable thixotropes can include fumed silica, bentonite, stearic acid-coated calcium carbonate, fatty acid/oil derivatives and associative urethane thickeners such as RM-8 which is commercially available from Rohm and Haas. The thixotropes can be present in an amount of up to 20 weight percent. Optional additional ingredients such as carbon black or graphite, blowing agents, expandable polymeric microspheres or beads, such as polypropylene or polyethylene microspheres, surfactants and corrosion inhibitors like barium sulfonate can be present in an amount of less than 5 weight percent of the total weight of the composition.

The viscosities of these coating products can be application-specific based on type of equipment used, required film thickness and sag resistance. In alternate embodiments, the viscosity of the coating compositions can be greater than 1000, or from 1000 to 1,000,000 centipoise ("cp") measured at 2 RPM with a #7 spindle Brookfield measurement. In further embodiments, sprayable compositions can have viscosities below 100,000 cp at 20 RPM reading on the Brookfield viscometer at ambient temperature (about 25° C.).

In an embodiment, the coating composition of the present invention can be prepared by mixing the polymeric microparticle dispersion with the other components of the coating composition in a high-energy vacuum mixer such as Dual Disperser Model HHL-2-1000 commercially available from Hockmeyer.

The coating composition can be applied to the surface of a substrate. Any suitable method for application can be used and can include conventional techniques known in the art. Suitable application methods can include spraying, extrusion, or by hand with a blade. Any suitable substrate can be used. Non-limiting examples of suitable substrates can include those formed from metal, polymers, such as thermoset materials and thermoplastic materials, and combinations of metal and polymeric substrates. Suitable metal substrates that can be coated according to the present invention include ferrous metals such as iron, steel, and alloys thereof, non-ferrous metals such as aluminum, zinc, magnesium and alloys thereof, and combinations thereof. In an embodiment, the substrate can be formed from cold rolled steel, electrogalvanized steel such as hot dip electrogalvanized steel or electrogalvanized iron-zinc steel, aluminum or magnesium. The metal substrate to be treated can be bare, pretreated or prepainted (for example by electrocoating) prior to application of the coating.

Suitable thermoset materials can include polyesters, epoxides, phenolics, polyurethanes such as reaction injected molding urethane (RIM) thermoset materials and mixtures thereof. Suitable thermoplastic materials can include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations. Plural encompasses singular and vice versa; for example, "a" or "an" can include more than one.

Whereas particular embodiments of this invention have been described above for purposes of illustration, it will be evident to those skilled in the art that numerous variations of the details of the present invention may be made without departing from the invention as defined in the appended claims. The present invention can be illustrated by the following specific, non-limiting examples.

EXAMPLES

The following examples are intended to illustrate the invention, and should not be construed as limiting the invention in any way. Example 1 shows the macromonomer preparation. Examples 2 and 3 show the preparation of two (2) different copolymers by polymerizing in aqueous medium a mixture of polymerizable ethylenically unsaturated monomers in the presence of the macromonomer of Example 1.

Examples 4 and 5 show the preparation of two (2) different coating compositions for sound and vibration dampening comprising the aqueous dispersions of polymeric microparticles of Examples 2 and 3.

Example 1

Macromonomer Preparation (04-122-136A)

In a continuous 300 ml continuous stirred reactor the following charges were introduced to a reaction zone filled with aromatic hydrocarbon, Solvesso 100 at a temperature of 250° C. and 600-700 psi. The discharge pressure was 600-650 psi and a receiving vessel was set at 170° C. under full vacuum.

| Component | Parts by Weight (grams) |
|---|---|
| Charge 1 | |
| Isobutylene | 400 |
| Charge 2 | |
| Luperox DTA[1] | 11.4 |
| Charge 3 | |
| Butyl Acrylate | 880 |
| Hydroxy Propyl Acrylate | 320 |

[1]Luperox DTA is di-t-amyl peroxide available from Arkema.

The three charges were started simultaneously and reaction brought to steady state conditions. Product was continuously collected for 2.5 hours.

As determined by Gel Permeation Chromatography (GPC) using a polystyrene standard, the product had a weight average molecular weight of about 2500 and a number average molecular weight of about 1200. The product was essentially 100% non-volatile with a hydroxyl number determined to be about 90 and an unsaturation equivalent weight of about 1230.

Example 2

06-DLW-068

To a 3L round bottom flask equipped with an agitator, thermocouple, nitrogen inlet, and 2 feed zones the following charge was added:

| Component | Parts by weight (grams) |
|---|---|
| Deionized Water | 635.7 |
| Alipal CO-436[2] | 3.23 |

[2]Surfactant from Rhodia.

The charge was heated to 80° C. with a nitrogen blanket. At 80° C. the following charge was added and held for 5 minutes:

| Component | Parts by weight (grams) |
|---|---|
| Methyl Methacrylate | 14.5 |
| Butyl Acrylate | 5.2 |

After the 5-minute hold, the following charge was added and held 30 minutes:

| Component | Parts by weight (grams) |
|---|---|
| Deionized Water | 11.36 |
| Ammonium Persulfate | 5.2 |

After the 30-minute hold, the following monomer pre-emulsion initiator feed were added over a three-hour period:

| Component | Parts by weight (grams) |
|---|---|
| Pre-emulsion | |
| Butyl Acrylate | 307.44 |
| Macromonomer (Ex. 1) | 78.7 |
| Methyl Methacrylate | 261.3 |
| Hydroxy Ethyl Methacrylate | 91.13 |
| Ethylhexyl Acrylate | 7.8 |
| Methacrylic Acid | 9.75 |
| Alipal CO-436 | 10.65 |
| Deionized Water | 265.01 |
| Initiator Feed | |
| Deionized Water | 245.62 |
| Ammonium Persulfate | 2.08 |

After the feeds were complete, the reaction was held for 1 hour at 80° C. The reaction was cooled to ambient temperature and the following solution was added to raise the pH.

| Component | Parts by weight (grams) |
|---|---|
| Dimethyl Ethanol Amine | 8.58 |
| Deionized Water | 12.74 |

The latex had a solids content of 36.32%, a pH value of 9.05 and a Brookfield Viscosity of 120 cps (Spindle #2/60 rpm).

Example 3

06-DLW-065

To a 3L round bottom flask similarly equipped as previously described, the following charge was added and heated to 81° C. under a nitrogen blanket.

| Component | Parts by weight (grams) |
|---|---|
| Deionized Water | 554.4 |
| Alipal CO-436 | 0.716 |

At 81° C., the following was added and held 5 minutes:

| Component | Parts by weight (grams) |
|---|---|
| Methyl Methacrylate | 13.15 |
| Butyl Acrylate | 14.15 |

Then the following was added over 10 minutes and then reaction was held for 30 minutes:

| Component | Parts by weight (grams) |
|---|---|
| Deionized Water | 8.52 |
| Ammonium Persulfate | 0.433 |

After the hold period the following monomer pre-emulsion and initiator feeds were added over 3 hours followed by a one-hour hold at 80° C.:

| Component | Parts by weight (grams) |
|---|---|
| Pre-emulsion | |
| Acrylonitrile | 148.64 |
| Butyl Acrylate | 316.95 |
| Macromonomer (Ex. 1) | 59.46 |
| MPEG-550MA[3] | 34.9 |
| Methacrylic Acid | 7.46 |
| Alipal CO-436 | 2.84 |
| Deionized Water | 170.8 |
| Initiator Feed | |
| Deionized Water | 106.5 |
| Alipal CO-436 | 7.1 |
| Ammonium Persulfate | 1.701 |

[3]Methoxy polyethylene glycol methacrylate available from Laporte Chemicals.

After the one-hour hold period, the following separate were added and the reaction held an additional 2 hours:

| Component | Parts by weight (grams) |
|---|---|
| Hydrogen Peroxide (35%) | 3.4 |
| Deionized Water | 4.98 |
| Isoascorbic Acid | 1.19 |
| Deionized Water | 12.44 |

The reaction was then cooled to <50° C. and the following was added to raise the pH:

| Component | Parts by weight (grams) |
|---|---|
| Dimethyl Ethanol Amine | 6.54 |

The latex had a solids content of 40.25%, a pH of 8.11 and a Brookfield Viscosity of 132.5 cps (Spindle #2/60 rpm).

Examples 4 and 5

The ingredients of each of the compositions shown in Table 2 below were mixed at low agitation in a pint-sized container using an air-driven motor. The ingredients were added to the container in the order shown in Table 2, and increasing the mixing speed to maintain a vortex throughout the addition. Each sample was placed in a vacuum chamber equipped with an agitator and a vacuum of at least 700 mm Hg to the agitated sample. The sample was removed when foaming subsided (about 35 minutes).

TABLE 2

Sound and Vibration Dampening Compositions

| Components | EX. 4 | EX. 5 |
|---|---|---|
| Copolymer | 66.6 (Ex. 2) | 66.6 (Ex. 3) |
| PM 210[1] | 0.9 | 0.9 |
| Foamaster 111[2] | 0.07 | 0.07 |
| Dolocron 4512[3] | 135 | 135 |

TABLE 2-continued

Sound and Vibration Dampening Compositions

| Components | EX. 4 | EX. 5 |
|---|---|---|
| AQUABLACK 245[4] | 0.9 | 0.9 |
| ASE 60[5] | 1 | 1 |
| Total | 204.5 | 204.5 |

[1]PM 210: Water dispersion of 33% sodium salt of naphthalenesulfonic acid.
[2]Foamaster 111: Hydrocarbon defoamer commercially available from Cognis Canada.
[3]Dolocron 4512: Dolomite calcium magnesium carbonate commercially available from Specialty Minerals.
[4]AQUABLACK 245: Aqueous dispersion of carbon black available from Borden Chemical Co.
[5]ASE 60: Rheology modifier available from Rohm and Haas.

Draw downs of 3-4 inch long samples using a 3-inch wide 120-mil thick coating template were prepared on test panels coated with ED-6060 electrocoat which is commercially available from PPG Industries, Inc. of Pittsburgh, Pa. Each draw down was air dried at ambient temperature (about 25° C.).

Mudcracking was evaluated on a separate set of panels. The mudcracking determination was a visual determination based upon number, width and length of cracks. The coating on each panel was baked for 30 minutes at ambient temperature (about 25° C.) and then for 30 minutes at 171° C.

The sound damping of each coating was measured using the Oberst ASTM Test Method E756-93 ("Standard Test Method for Measuring Vibration-Damping Properties of Materials"), Sections 3 and 10. The principal measure of sound dampening in this test is loss factor, the ratio of loss modulus to storage modulus of the material. Oberst values typically range from 0.001 for uncoated steel (thickness 30 mils) (if the steel panel is struck, one would hear a "clang") to 0.01 ("bong") to 0.1 ("bunk") to 0.5 ("thud") for increasingly efficient coatings. The Oberst test measures the sound loss factor of the coating-substrate composite.

Each test sample was applied to an Oberst Bar, which is a metal bar formed from special oil-hardening ground flat stock, AISI/SAE GRD 0-1, 1/32 inch (0.8 mm) thick, 1/2 inch (12.7 mm) wide from McMaster-Carr, part number 89705-K121 and cured as described above. The weight of each cured coating was 9.0±0.12 grams. The Oberst loss factor values were normalized to 9.0 grams for comparison. Composite loss factors were compared at 200 Hz at temperatures of 10, 25 and 40° C. The results are reported in Table 3 below.

TABLE 3

| | EX. 4 | EX. 5 |
|---|---|---|
| Coating appearance after drying | | |
| Mudcracking | none | none |
| Oberst Sound Damping Test | | |
| Coating Weight (g) | 8.64 | 9.07 |
| Oberst Loss Factor @ 200 Hz Normalized to 9 g weight | | |
| 10° C. | 0.067 | 0.030 |
| 25° C. | 0.184 | 0.114 |
| 40° C. | 0.224 | 0.250 |

Whereas particular embodiments of this invention have been described above for purposes of illustration, it will be evident to those skilled in the art that numerous variations of the details of the present invention may be made without departing from the invention as defined in the appended claims.

What is claimed is:

1. A copolymer prepared by polymerizing in an aqueous medium one or more polymerizable ethylenically unsaturated monomers in the presence of a macromonomer that is comprised of at least 30 mole percent of residues having the following alternating structural units:

$$\text{\textendash}[DM\text{-}AM]\text{\textendash}$$

wherein DM represents a residue from a donor monomer, AM represents a residue from an acceptor monomer, at least 15 mole percent of the macromonomer comprises a donor monomer of the structure:

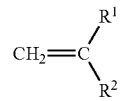

wherein $R^1$ is a linear or branched $C_1$ to $C_4$ alkyl, $R^2$ is selected from linear, cyclic or branched $C_1$ to $C_{20}$ alkyl, alkenyl, $C_6$ to $C_{20}$ aryl, alkaryl and aralkyl, wherein the macromonomer is substantially free of maleate monomer segments and fumarate monomer segments, and the macromonomer is substantially free of Lewis acids and transition metals.

2. The copolymer of claim 1 in which the polymerizable ethylenically unsaturated monomers form a polymeric backbone segment and the macromonomer forms a polymeric segment that is pendant to the backbone.

3. The copolymer of claim 1 in which the macromonomer is prepared via free radical initiated polymerization.

4. The copolymer of claim 1 in which the donor monomer is selected from isobutylene, diisobutylene, dipentene, isoprenol and mixtures thereof.

5. The copolymer of claim 1 in which the acceptor monomer comprises one or more monomers of the structure:

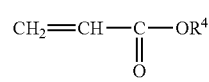

where $R^4$ is selected from H, linear or branched $C_1$ to $C_{20}$ alkyl, alkylol, $C_6$ to $C_{20}$ aryl, alkaryl and aralkyl.

6. The copolymer of claim 5 in which the acceptor monomer is selected from hydroxyethyl acrylate, hydroxypropyl acrylate, acrylic acid, methyl acrylate, ethyl acrylate, butyl acrylate, isobutyl acrylate, isobornyl acrylate and 2-ethylhexyl acrylate.

7. The copolymer of claim 1 in which the macromonomer has a number average molecular weight of 500 to 10,000.

8. The copolymer of claim 7 in which the macromonomer has a polydispersity of less than 3.

9. The copolymer of claim 1 in which the polymerizable ethylenically unsaturated monomers are vinyl monomers.

10. The copolymer of claim 9 in which the vinyl monomers are of the structure:

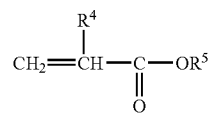

where $R^4$ is H or methyl and $R^5$ is selected from H, linear or branched $C_1$ to $C_{20}$ alkyl, alkylol, $C_6$ to $C_{20}$ aryl, alkaryl and aralkyl.

11. The copolymer of claim 10 in which the vinyl monomer is selected from hydroxyethyl methacrylate, hydroxypropyl methacrylate, methyl methacrylate, 2-ethylhexyl acrylate and methacrylic acid.

12. The copolymer of claim 1 in which the polymerization is conducted via polymerization in aqueous medium.

13. The copolymer of claim 1 which has a number average molecular weight greater than 50,000.

14. A coating composition for sound and vibration dampening comprising:
(a) an aqueous dispersion of polymeric microparticles in which the polymeric microparticles comprise a copolymer prepared by polymerizing in aqueous medium one or more polymerizable ethylenically unsaturated monomers in the presence of a macromonomer that is comprised of at least 30 mole percent of residues having the following alternating structural units:

—[DM-AM]— wherein DM represents a residue from a donor monomer, AM represents a residue from an acceptor monomer, at least 15 mole percent of the macromonomer comprises a donor monomer of the structure:

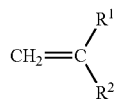

wherein $R^1$ is a linear or branched $C_1$ to $C_4$ alkyl, $R^2$ is selected from linear, cyclic or branched $C_1$ to $C_{20}$ alkyl, alkenyl, $C_6$ to $C_{20}$ aryl, alkaryl and aralkyl, wherein the macromonomer is substantially free of maleate monomer segments and fumarate monomer segments, and the macromonomer is substantially free of Lewis acids and transition metals;
(b) a filler comprising about 20 to 90 percent by weight of the coating composition, the percentage by weight being based on total weight of the coating composition.

15. The coating composition of claim 14 in which the polymerizable ethylenically unsaturated monomers form a polymeric backbone segment and the macromonomer forms a polymeric segment that is pendant to the backbone.

16. The coating composition of claim 14 in which the macromonomer is prepared via free radical initiated polymerization.

17. The coating composition of claim 14 in which the donor monomer is selected from isobutylene, diisobutylene, dipentene, isoprenol and mixtures thereof.

18. The coating composition of claim 14 in which the acceptor monomer comprises one or more monomers of the structure:

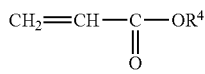

where $R^4$ is selected from H, linear or branched $C_1$ to $C_{20}$ alkyl, alkylol, $C_6$ to $C_{20}$ aryl, alkaryl and aralkyl.

19. The coating composition of claim 18 in which the acceptor monomer is selected from hydroxyethyl acrylate, hydroxypropyl acrylate, acrylic acid, methyl acrylate, ethyl acrylate, butyl acrylate, isobutyl acrylate, isobornyl acrylate and 2-ethylhexyl acrylate.

20. The coating composition of claim 14 in which the macromonomer has a number average molecular weight of 500 to 10,000.

21. The coating composition of claim 20 in which the macromonomer has a polydispersity of less than 3.

22. The coating composition of claim 14 in which the polymerizable ethylenically unsaturated monomers are vinyl monomers.

23. The coating composition of claim 22 in which the vinyl monomers are of the structure:

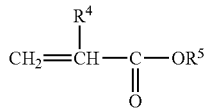

where $R^4$ is H or methyl and $R^5$ is selected from H, linear or branched $C_1$ to $C_{20}$ alkyl, alkylol, $C_6$ to $C_{20}$ aryl, alkaryl and aralkyl.

24. The coating composition of claim 23 in which the vinyl monomer is selected from hydroxyethyl methacrylate, hydroxypropyl methacrylate, methyl methacrylate, 2-ethylhexyl acrylate and methacrylic acid.

25. The coating composition of claim 14 in which the polymerization is conducted via polymerization in aqueous medium.

26. The coating composition of claim 14 which has a number average molecular weight greater than 50,000.

27. The coating composition of claim 14 in which the filler comprises calcium, magnesium carbonate, calcium metasilicate.

28. The coating composition of claim 14 in which the filler comprises barium sulfate, ceramic beads.

29. The coating composition of claim 14, which further comprises a plasticizer.

* * * * *